United States Patent
Shimizu

(10) Patent No.: US 10,398,197 B2
(45) Date of Patent: Sep. 3, 2019

(54) CORD LOCK

(71) Applicant: NIFCO INC., Yokosuka-shi, Kanagawa (JP)

(72) Inventor: Yohei Shimizu, Chigasaki (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 58 days.

(21) Appl. No.: 15/832,999

(22) Filed: Dec. 6, 2017

(65) Prior Publication Data
US 2018/0153262 A1    Jun. 7, 2018

(30) Foreign Application Priority Data

Dec. 6, 2016 (JP) .................................. 2016-236353

(51) Int. Cl.
*A43C 7/04* (2006.01)
*F16G 11/10* (2006.01)

(52) U.S. Cl.
CPC .............. *A43C 7/04* (2013.01); *F16G 11/101* (2013.01); *F16G 11/106* (2013.01); *F16G 11/105* (2013.01)

(58) Field of Classification Search
CPC ....... A43C 7/04; F16G 11/106; F16G 11/101; F16G 11/105
See application file for complete search history.

(56) References Cited

U.S. PATENT DOCUMENTS

| | | | | |
|---|---|---|---|---|
| 3,965,544 A | * | 6/1976 | Boden | ................... F16G 11/101 24/136 R |
| 4,156,574 A | * | 5/1979 | Boden | ................... F16G 11/106 24/115 M |
| 4,477,947 A | * | 10/1984 | Lyons | ..................... F16G 11/12 24/115 F |

(Continued)

FOREIGN PATENT DOCUMENTS

| | | |
|---|---|---|
| CN | 1102815 A | 5/1995 |
| EP | 2607747 A2 | 6/2013 |

(Continued)

OTHER PUBLICATIONS

Europe Patent Office, "Search Report for European Patent Application No. 17205623.6," dated May 14, 2018.

*Primary Examiner* — Robert Sandy
*Assistant Examiner* — Louis A Mercado
(74) *Attorney, Agent, or Firm* — Manabu Kanesaka

(57) ABSTRACT

A cord lock includes a main body having front and rear walls and two side walls, an elongated hole, and an inclined portion formed in an inner surface of the side walls; and an operating button having front and rear wall side operating portions arranged on the front wall and the rear wall, respectively, a connecting portion integrally connected to the front and rear wall side operating portions through the elongated hole, a biasing device biasing the front and rear side operating portions to the one side opening to cooperate with the inclined portion, and a gear-shaped engagement portion adapted to pinch the band inserted into the tubular (Continued)

shape. The operating button has a pivot portion, wherein a distance between an axial end of the pivot portion and a shaft end supporting the gear-shaped engagement portion is narrower than a thickness of the gear-shaped engagement portion.

5 Claims, 13 Drawing Sheets

(56) References Cited

U.S. PATENT DOCUMENTS

| | | | | |
|---|---|---|---|---|
| 4,765,034 A | * | 8/1988 | Kasai | F16G 11/101 24/136 R |
| 4,878,269 A | * | 11/1989 | Anscher | F16G 11/101 24/115 G |
| 4,912,814 A | * | 4/1990 | McKenzie | A41D 25/022 24/115 H |
| 5,435,044 A | * | 7/1995 | Ida | F16G 11/106 24/115 M |
| 5,454,140 A | * | 10/1995 | Murai | F16G 11/101 24/115 H |
| 5,477,593 A | * | 12/1995 | Leick | A43C 7/00 24/136 A |
| 5,572,770 A | * | 11/1996 | Boden | F16G 11/101 24/136 R |
| 5,894,639 A | * | 4/1999 | Boden | F16G 11/106 24/115 G |
| 6,029,870 A | * | 2/2000 | Giacona, III | A45F 3/14 224/148.6 |
| 6,036,066 A | * | 3/2000 | Giacona, III | A45C 13/30 224/148.6 |
| 6,339,867 B1 | * | 1/2002 | Azam | A43C 7/08 24/115 G |
| 6,443,338 B1 | * | 9/2002 | Giacona, III | A45C 13/30 224/148.6 |
| 7,231,699 B2 | * | 6/2007 | Borsoi | A43C 7/00 24/136 A |

FOREIGN PATENT DOCUMENTS

| | | |
|---|---|---|
| JP | H02-006809 Y2 | 2/1990 |
| JP | 3019914 U | 1/1996 |

* cited by examiner (BAND LOCKING STATE)

(BAND UNLOCKING STATE)

(STATE WHERE ASSEMBLY FINISHED)

(MIDSTREAM STATE WHERE CORD LOCK IS SET TO BAND)

(STATE OF USE WHERE CORD LOCK IS SET TO BAND)

Fig. 11A
Prior Art
Fig. 11B
Prior Art
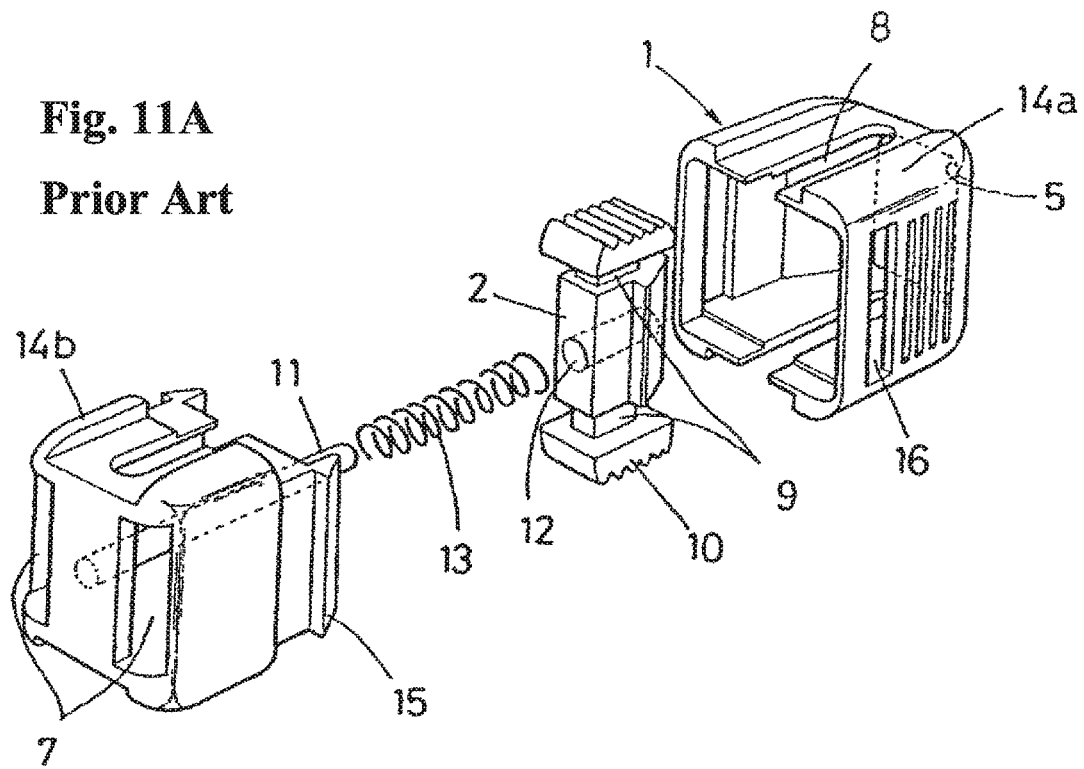
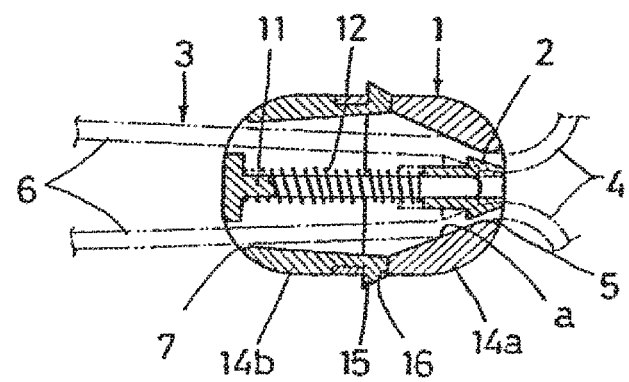

CORD LOCK

BACKGROUND OF THE INVENTION

Technical Field

The present invention relates to a cord lock which is preferable for locking both end sides of a band (including a rope, a cord and similar structures, same applies to the below description), for example, arranged around an opening edge of a shoe and clothes with an optional length, or adjusting a drawing amount and a fastening degree of the band.

Related Art

FIGS. 11A and 11B show a cord lock (a band fastening tool) disclosed in JP H02-6809 Y. In this structure, the cord lock is constructed by a main body 1 which is formed into a tubular shape with front and rear walls and both side walls; a band 3 can insert from one side opening of the tubular shape into the other side opening, and the cord lock has a long hole 8 arranged so as to face to the front and rear walls and extending in a direction of the tube and an inclined portion a formed in an inner surface of both the side walls and expanding toward the depth, and an operating button (a band biting member) 2 which is structured such that a front wall side operating portion and a rear wall side operating portion arranged on the front wall and the rear wall, respectively, via the long hole 8 are integrally connected via a connection portion, cooperates with the inclined portion a by biasing to a one side opening direction by means of a coil spring 13 serving as a biasing means, and is provided with an engagement portion which can pinch the band 3 inserted into the tubular shape. In operation, the operating portions in both sides of the operating button 2 is moved against the biasing force of the coil spring 13 with fingers from a locking state in which the band 3 is pinched by the inclined portion a and the engagement portion of the operating button 10 as shown in FIG. 11B, in the case of adjusting the fastening degree of the band. Then, the engagement portion of the operating button 10 comes away from the inclined portion and the band comes to an unlocking state. Therefore, the locking state is again achieved by releasing the fingers from the operating portion after changing the position of the cord lock in relation to the band 3. Reference symbol 14b denotes a split body which is installed into the main body 1. In the split body 14b, both ends 6 of the band 3 are draw from a drawing hole 7 to lock one end side of the coil spring 13.

The above structure is excellent in operability particularly since the operating button 10 can be operated to move by utilizing the upper and lower operating portions. However, since the engagement portion of the operating button 10 is formed into a flat inclined surface which corresponds to the inclined portion a, the engagement portion lacks friction resistance when pinching the band 3 in relation to the inclined portion a and is hard to increase a pinching force, so that the engagement portion becomes further weak due to friction in the case where the friction resistance repeatedly fastens the band. FIGS. 12A, 12B and 13A, 13B are two examples which dissolve the defect mentioned above by devising the engagement portion of the operating button.

FIGS. 12A and 12B show a cord lock (a band stopper) which is disclosed in JP 3019914 Y. In this structure, an operating button (an operating body) 2 integrally has a pinching portion 2c which is arranged in an outer surface of a case (a main body) 1 and is moved along a long groove (a guide groove) 1a of the case 1, a pinching portion 2b which can pinch a band 4 in relation to an inclined portion formed in an inner surface of a case side wall 1c, and a convex portion 1f which locks one end of a coil spring 3. Further, the pinching portion 2b forms a lot of gear-shaped protrusions 2a on an outer periphery approximately having a circular arc shape, and easily maintains an initial pinching force even in the case where the pinching portion increases the friction resistance on the basis of a biting action of the protrusion 2a applied to the band in relation to the inclined portion of the side wall 1c or is worn away.

FIGS. 13A and 13B show a cord lock disclosed in U.S. Pat. No. 5,477,593. In this structure, an operating button 6 integrally has an operating portion 27 which is arranged in an outer surface of a case 4 and is moved along a long hole (a long groove) 20 of the case, elastic piece portions 25 which serve as a biasing means, and a pivot portion 11 which supports a gear or a gear-shaped engagement body 5. The gear-shaped engagement body 5 can maintain the initial pinching force even in the case where the gear-shaped engagement body increases the friction resistance on the basis of the biting action of the gear tooth applied to a band 17 in relation to an inclined portion of a case side wall or is worn away. Further, in this structure, the gear-shaped engagement body 5 is pivotally supported to the pivot portion 11 in comparison with the structure in which the pinching portion 2b cannot rotate as disclosed in JP 3019914 Y. Accordingly, this structure can reduce or absorb excessive stress which is applied from the band by a rotation around the pivot portion serving as a supporting point or by a slight movement, and is therefore preferable in the light of durability.

SUMMARY OF THE INVENTION

In the meantime, the cord lock may be evaluated particularly in the following items.

(i) A point that usability or operability of a user is good. In this regard, the operating button arranges the operating portions in both the outer surfaces of the main body front and rear walls in the structure of JP H02-6809 Y. As a result, this structure is more excellent than the structure in which the operating portion is provided only in one side as disclosed in JP 3019914 Y and U.S. Pat. No. 5,477,593. Further, although the conventional example has a structure in which operating portions are provided in both sides (for example, TW M4895235), the operating portion becomes narrow and a space is enlarged in a radial direction of the gear. As a result, it is hard to grip and the operability is deteriorated.

(ii) A point that an unlocking operation can be achieved with no feeling of strangeness. In this regard, in the structure of U.S. Pat. No. 5,477,593, the biasing means is constructed by a resin elastic piece in comparison with the metal spring member as disclosed in JP H02-6809 Y and JP 3019914 Y. As a result, the strong or heavy operating force is required and a premium feel is lost.

(iii) A point that a pinching force is strong and is maintained over the long term. In this regard, in the gear-shaped engagement body disclosed in U.S. Pat. No. 5,477,593, the biting force against the band is great and the engagement portion is rotatably supported to the pivot portion in the operating button side in comparison with the structure in which the engagement portion cannot rotate as disclosed in JP H02-6809 Y and JP 3019914 Y. As a result, the engagement portion is hard to be worn away and reduces and absorbs the excessive external force applied from the band, and this structure is preferable in the light of durability.

Accordingly, an object of the present invention is to provide a cord lock which is more excellent in the durability and the operability by improving the items listed up in the above (i) to (III) and particularly improving the support structure of the gear-shaped engagement body. The other objects will be apparent from the following description of the contents.

In order to achieve the above object, each of the inventions according to first and second aspects aims at the following cord lock (6) by being specified with reference to an example in FIGS. 1A to 10C. A preamble requirement of these inventions exists in the cord lock (6) including a main body (1) and an operating button (2). The main body (1) is formed into a tubular shape with front and rear walls (10, 11) and both side walls (12), can insert a band from one side opening (16) of the tubular shape into the other side opening (17), and has a long hole (14) arranged so as to face the front and rear walls and extending in a direction of the tube and an inclined portion (12a, 18) formed in an inner surface of both the side walls and expanding toward the depth. The operating button (2) is structured such that a front wall side operating portion (20) and a rear wall side operating portion (21) arranged on the front wall and the rear wall, respectively, via the long hole are integrally connected via a connection portion (22), cooperates with the inclined portion by biasing to a one side opening (a direction of 16) by means of a biasing means (5), and is provided with a gear-shaped engagement portion (4) which can pinch the band inserted into the tubular shape.

A substantial part of the first aspect is described, for example, with reference to examples in FIGS. 7A to 10C, in that the operating button (2) has a pivot portion (25 or 25A) which protrudes out of at least one of the front wall side operating portion (20) and the rear wall side operating portion (21) toward the other thereof, and to which the gear-shaped engagement portion (4) is axially supported, a distance between an axial end of the pivot portion and a shaft end supporting the gear-shaped engagement portion (4) arranged in the other side (a structure of the pivot portion 25 facing the pivot portion 25 in the example in FIGS. 8A, 8B and 8C or a structure of the pivot portion 25A arranged in the rear side wall portion 11 in the example in FIGS. 10A, 10B and 10C) or a support portion (a support portion 26 in the example in FIG. 7 or one of the front and rear walls 10 and 11 in the example in FIGS. 9A, 9B and 9C or a support portion 24 in the example in FIGS. 10A, 10B and 10C) is narrower than a thickness of the gear-shaped engagement portion, the distance is expanded by an elastically deforming portion (22a or 24a) which is arranged in the operating button, and the gear-shaped engagement portion (4) can pass through.

In the meantime, a substantial part of the second aspect is described, with reference to the examples in FIGS. 3, 7 and 8, in that the operating button (2) has a support piece (24) which is provided in the connection portion (22), and a pivot portion (25) which is arranged in the support piece (24) and protrudes toward one of the front wall side operating portion and the rear wall side operating portion, and to which the gear-shaped engagement portion (4) is axially supported, a distance between an axial end of the pivot portion and a shaft end supporting the gear-shaped engagement portion arranged in the other side (the structure of the pivot portion 25 arranged in the support piece 26 in the example in FIGS. 8A, 8B and 8C) or a support portion (the support portion 26 in the example in FIGS. 3 and 7) is narrower than the thickness of the gear-shaped engagement portion, the distance is expanded by the elastically deforming portion (22a or 24a) which is arranged in the operating button, and the gear-shaped engagement portion can pass through.

The present inventions mentioned above are preferably specified as being specified by second to fifth aspects.

Firstly, the elastically deforming portion is constructed by the structure of the connection portion as exemplified in FIGS. 6A, 6B and 6C (third aspect).

Secondly, the elastically deforming portion is constructed by the structure of the support piece or the support portion as exemplified in FIGS. 7A-7C and 8A-8C (fourth aspect).

Thirdly, as exemplified in FIGS. 5A-5C and 6A-6C, the biasing means is a coil spring, is provided with a come-off prevention portion so as to partly close an opening end as well as having a seat which receives a corresponding end portion of the coil spring in the other side opening, and is structured such that the open portion other than a closed portion of the come-off prevention portion is set to an insertion portion of the band (fifth aspect).

In each of the inventions according to the first and second aspects, an improved operability can be obtained by the operating portions arranged in both outer surfaces of the case front and rear walls as mentioned above in comparison with the structure in which the operating portion is provided only in one of the front and rear walls or is provided in both sides of the case, and a stably strong pinching force can be obtained by employment of the gear-shaped engagement portion. Further, in each of the inventions, since the operating portion is arranged in an axial direction of the gear-shaped engagement portion, the operating portion can be set to be wide in surface without deterioration of an outer appearance, and can be made thin and compact as a whole. Further, since the gear-shaped engagement portion is rotatably supported to the pivot portion, the gear-shaped engagement portion is hard to be worn away. In addition, the following advantages are provided.

The invention according to the first aspect is excellent in an assembling property since the gear-shaped engagement portion is easily supported to the operating button, for example, as can be estimated from the examples in FIGS. 7A to 10C, as the support structure of the gear-shaped engagement portion, and is assembled into the main body from this state. Further, since the gear-shaped engagement portion is pivotally supported to the pivot portion within the main body, it is possible to efficiently reduce or absorb a load even if the great load is applied from the band, it is possible to stably maintain the pinching force applied to the band and it is possible to improve the durability.

The invention according to the second aspect is excellent in the assembling property since the gear-shaped engagement portion is easily supported to the operating button, for example, as can be estimated from the examples in FIGS. 3A-3C, 7A-7C and 8A-8C, as the support structure of the gear-shaped engagement portion, and is assembled into the main body from this state. Further, since the gear-shaped engagement portion is pivotally supported to the pivot portion in a state of being pinched between the support piece and the corresponding portion thereto within the main body, the gear-shaped engagement portion is not accidentally inclined and does not become non-rotatable even if any great load is applied from the band. As a result, it is possible to efficiently reduce or absorb the excessive external force, it is possible to stably maintain the pinching force and it is possible to improve the durability.

In the invention according to the third aspect, the elastically deformation of the connection portion connecting the operating portions to each other is restricted in a state in which the operating button is assembled in the main body, on the basis of the state in which the front and rear walls of the main body are pinched by both the operating portions as is known from FIGS. 4A, 4B and 4C. As a result, the structure can be easily achieved without deterioration of quality and can also be thinned.

In the invention according to the fourth aspect, the elastically deformation of the support piece and the support portion provided in the connection portion in the protruding manner is restricted in the state in which the operating button is assembled in the main body, on the basis of the state in which the support piece and the support portion are pinched between the gear-shaped engagement portion and the corresponding one of the main body front and rear walls as is estimated from FIGS. 4A, 4B and 4C. As a result, the structure can be easily achieved without deterioration of quality and can also be thinned.

In the invention according to the fifth aspect, it is possible to secure an entire rigidity and improve a stamping strength under existence of the come-off prevention portion. Further, since the insertion position of the band is divided between the right and left side walls and the come-off prevention portion as shown in the embodiment, it is possible to easily prevent the band from intertwining as is estimated from FIG. 6C.

BRIEF DESCRIPTION OF DRAWINGS

FIGS. 1A and 1B are schematic outer appearance view of a cord lock according to an embodiment in a used state, in which FIG. 1A is an outer appearance view showing a band locking state, and FIG. 1B is an outer appearance view showing a band unlocking state;

FIGS. 3A to 3C show a way when a gear-shaped engagement portion is supported to an operating button, in which FIG. 3A is a side elevational view before supporting, FIG. 3B is a side elevational view in a process of a supporting operation, and FIG. 3C is a side elevational view after supporting;

FIGS. 4A to 4C show the cord lock mentioned above in a state where assembling of the cord lock is finished, in which FIG. 4A is a top elevational view, FIG. 4B is a cross sectional view along a line A-A in FIG. 4A, and FIG. 4C is a cross sectional view along a line B-B in FIG. 4B;

FIGS. 5A to 5C show the cord lock mentioned above in a middle state where the cord lock is set to a band, in which FIG. 5A is a top elevational view, FIG. 5B is a cross sectional view along a line A1-A1 in FIG. 5A, and FIG. 5C is a cross sectional view along a line B1-B1 in FIG. 5B;

FIGS. 6A to 6C show the cord lock mentioned above in a state of a using time where the cord lock is set to the band, in which FIG. 6A is a top elevational view, FIG. 6B is a cross sectional view along a line A2-A2 in FIG. 6A, and FIG. 6C is a cross sectional view along a line B3-B3 in FIG. 6B;

FIGS. 7A to 7C show a modified example 1 of the operating button mentioned above in correspondence to FIGS. 3A, 3B and 3C, in which FIG. 7A is a side elevational view before supporting a gear-shaped engagement portion, FIG. 7B is a side elevational view in a process of a supporting operation, and FIG. 7C is a side elevational view after supporting;

FIGS. 8A to 8C show an example in which the support portion in FIGS. 7A, 7B and 7C is modified to a support piece, in which FIG. 8A is a side elevational view before supporting the gear-shaped engagement portion and showing to correspond to FIG. 3A, FIG. 8B is a view showing to correspond to FIG. 5B, and FIG. 8C is a view showing to correspond to FIG. 6B;

FIGS. 9A to 9C show a modified example 2 of the operating button, in which FIG. 9A is a side elevational view before supporting the gear-shaped engagement portion and showing to correspond to FIG. 3A, FIG. 9B is a view showing to correspond to FIG. 5B, and FIG. 9C is a view showing to correspond to FIG. 6B;

FIGS. 10A to 10C show a modified example 3 of the operating button, in which FIG. 10A is a side elevational view before supporting the gear-shaped engagement portion and showing to correspond to FIG. 3A, FIG. 10B is a view showing to correspond to FIG. 5B, and FIG. 10C is a view showing to correspond to FIG. 6B;

FIGS. 11A and 11B are views for describing a structure of JP H02-6809 Y;

DETAILED DESCRIPTION OF THE INVENTION

Figure 1A:
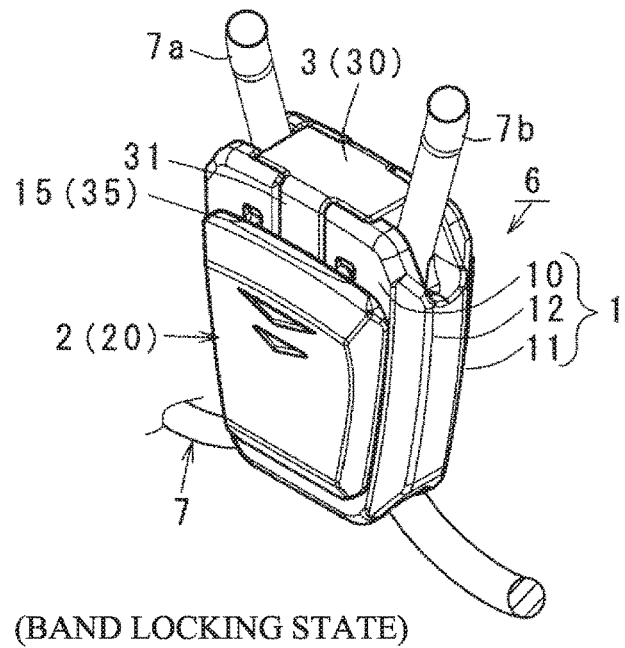

A description will be given of an optimum embodiment according to the present invention and modified examples thereof with reference to the accompanying drawings. The description will be given in detail of a structure of a cord lock according to the embodiment in FIGS. 1A to 6C, an example of use thereof, a modified example 1 in FIGS. 7A to 8c, a modified example 2 in FIGS. 9A, 9B and 9C and a modified example 3 in FIGS. 10A, 10B and 10C in this order.

(Structure)

A cord lock 6 according to the embodiment is provided with an approximately tubular case 1 which serves as a main body, an operating button 2 which is assembled in the case 1, a partition member 3 which is installed to the case 1 in a state of closing a case one side opening 16 and serves as a come-off prevention portion, a gear-shaped engagement portion 4 which can pinch a band 6 inserted into a tubular shape of the case 1 in relation to an inclined portion mentioned later and arranged within the case, and a coil spring 5 which can block movement of the band 6 by biasing the gear-shaped engagement portion 4 and serves as a biasing means. Although each of the case 1, the operating button 2 and the partition member 3 is a resin molded product, they may be made of the material other than the resin. The coil spring 5 is made of a metal. Although a whole size is enlarged for the reason of drawing figures, the actual size is considerably small.

Details thereof are as follows.

Figure 2:
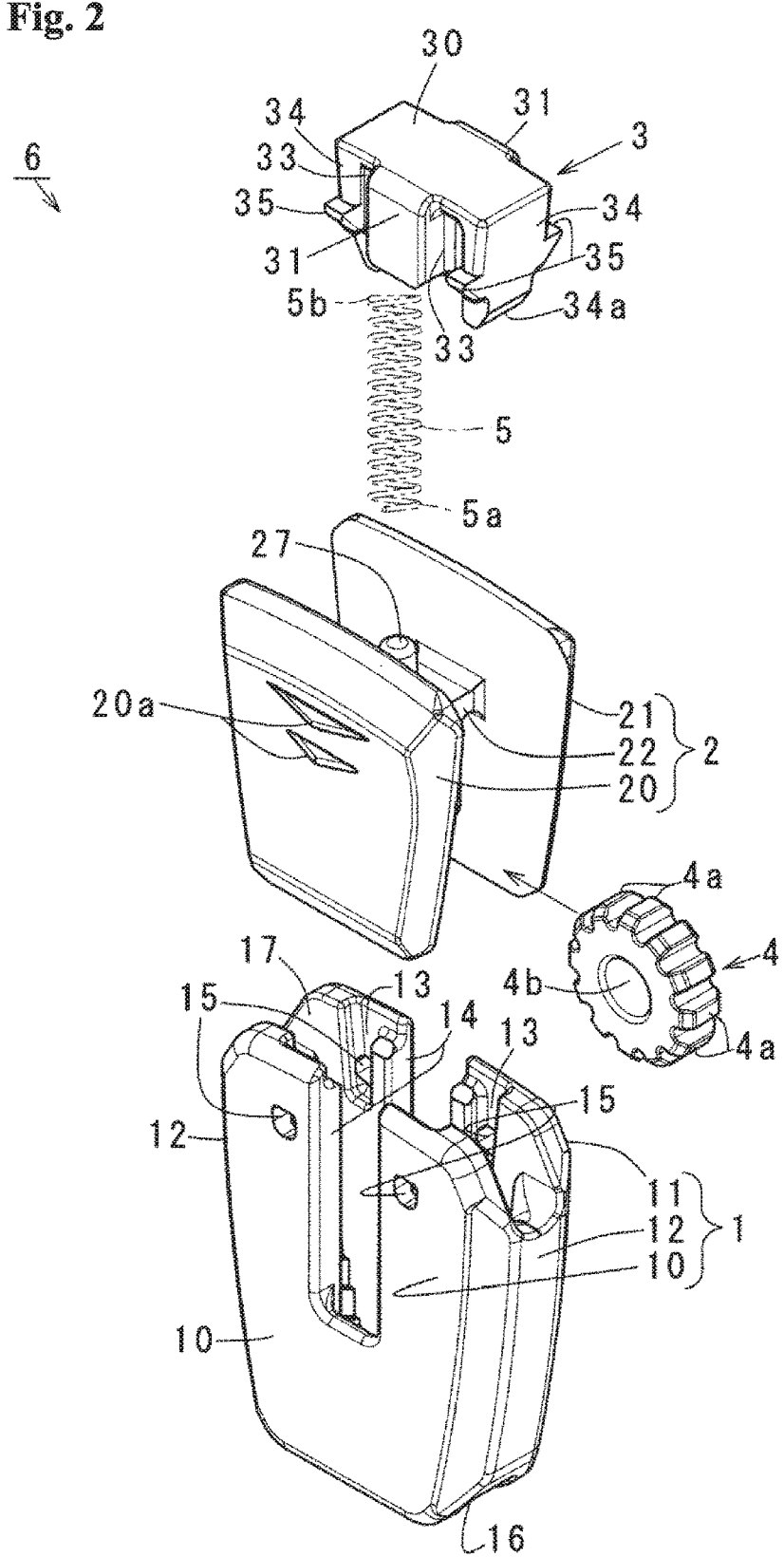
FIG. 2 is an exploded perspective view of the cord lock.
Figure 5A:
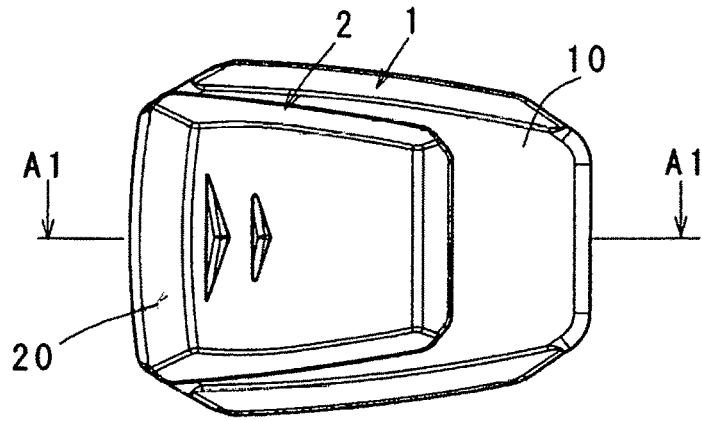
Figure 5B:
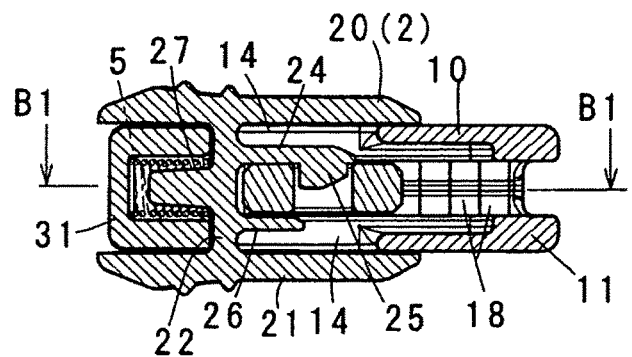
Figure 5C:
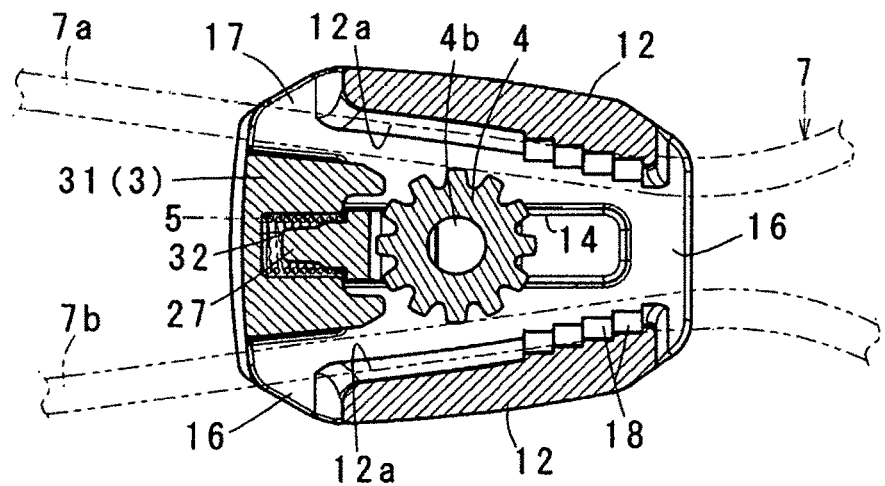

First of all, the case 1 is formed into a tubular shape which is divided by front and rear walls 10 and 11, and both side walls 12 and is long in an axial direction, as shown in FIGS. 2 and 5C, and the band 6 can be inserted from one side opening 17 of the tubular shape to the other side opening 16 or from the other side opening 16 to the one side opening 17. The case 1 is provided with a long groove 14 facing the front and rear walls 10 and 11, locking holes 15, a groove 13 extending from the other end in the opening 16 side to each of the locking holes 15, and an inclined portion 12a obtained by forming an inner surface of both the side walls 12 from the one end opening 17 side toward the other end opening 16 into an approximately tapered shape.

Among them, the long groove 14 is positioned in a laterally intermediate position and extends from the other end in the opening 16 side to a position which is a little short from one end side of the opening 17. The locking hole 15 is a position which engages the partition member 3, and is provided in right and left sides of the long groove 14 in the opening 16 side. The groove 13 guides the partition member 3 and can engage a stop 35 mentioned later with the locking hole 15. The inclined portion 12a is formed into a taper shape expanding toward the depth, that is, coming close to a center line of the front and rear walls little by little from the opening 16 toward the opening 17 side, and a concave-convex portion or a toothed portion 18 is formed in a predetermined range in the opening 17 side.

The operating button 2 is provided with a front wall side operating portion 20 which is arranged in an outer surface of the front wall 10 of the case, a rear wall side operating portion 21 which is arranged in an outer surface of the rear wall 11 of the case, a connection portion 22 which connects both the operating portions 20 and 21, a support piece 24 and a support portion 26 which are provided in a protruding manner in one side of the connection portion 22, and a shaft portion 27 which is provided in a protruding manner in the other side of the connection portion 22, as shown in FIGS. 2, 3A-3C and 5A-5C.

Among them, each of the operating portions 20 and 21 is formed with its plate width and length slightly smaller than the front and rear walls 10 and 11, and is formed into a flat plate shape which is considerably wider than the operating portion in JP H02-6809 Y. The operating portion is provided in its outer surface with two triangular marks 2a, that is, a large triangular mark 20a which is positioned in one end side of the operating portions 20 and 21 and a small triangular mark 20a which is positioned in a lower side thereof. The triangular marks 20a are additionally provided as occasion demands, and show a locking direction for constraining the band 6 in the operating button 2. As a result, in this example, the constraint of the band 6 is unlocked by moving the operating button 2 in an inverse direction to the direction of the triangular marks 20a.

The connection portion 22 connects the operating portion 20 and the operating portion 21 in an approximately center portion of facing inner surfaces. The support piece 24 and the support portion 26 are protruded out in a direction corresponding to the opening 16, and the shaft portion 27 is protruded out in a direction corresponding to the opening 17. Both ends of the connection portion 22, that is, positions connected to the operating portions 20 and 21 are slightly reduced in its thickness as a hinge portion, that is, an elastically deforming portion 22a. Further, as shown in FIG. 4B, a distance into which the corresponding portion to the case front wall 10 is inserted is kept between the operating portion 20 and the support piece 24. A distance into which the corresponding portion to the case rear wall 11 is inserted is kept between the operating portion 21 and the support portion 26. Further, the shaft portion 27 makes the coil spring 5 be stably supported to the connection portion 22 in a state of inserting into one end 5a of the coil spring.

Although the support piece 24 and the support portion 26 are differentiated according to provision of the pivot portion, the support portion 26 may be assumed as the support piece. More specifically, the support piece 24 and the support portion 26 keep such a distance that the gear-shaped engagement portion 4 is accommodated therebetween rotatably. The support piece 24 is provided with a pivot portion 25 so as to protrude from a side facing the support portion 26 approximately in parallel to the connection portion 22 or toward the direction of the support portion 26. The pivot portion 25 is a pivotal shaft which is fitted to a shaft hole 4b of the gear-shaped engagement portion 4.

In the above operating button 2, the gear-shaped engagement portion 4 is arranged between the support piece 24 and the support portion 26, and is rotatably supported by fitting the pivot portion 25 to the shaft hole 4b. In this operation, as shown in FIG. 3B, the front and rear operating portions 20 and 21 are pushed inward externally with fingers 8 and 9 in a direction of moving one end side of each of the operating portions close to each other, for example. Accordingly, the operating portions 20 and 21 are inclined by the corresponding elastically deforming portion 22a in a direction of expanding the distance between the other end sides, and the support piece 24 and the support portion 26 are accordingly inclined in an expanding direction so as to enlarge the distance between the support pieces. As a result, the gear-shaped engagement portion 4 can be supported with a one-touch operation by fitting the pivot portion 25 to the shaft hole 4b in a state in which the support piece 24 and the support portion 26 are displaced by the elastically deforming portion 22a. The gear-shaped engagement portion 4 forms a lot of gear teeth 4a and has a circular shaft hole 4b in its center portion.

Figure 3A:
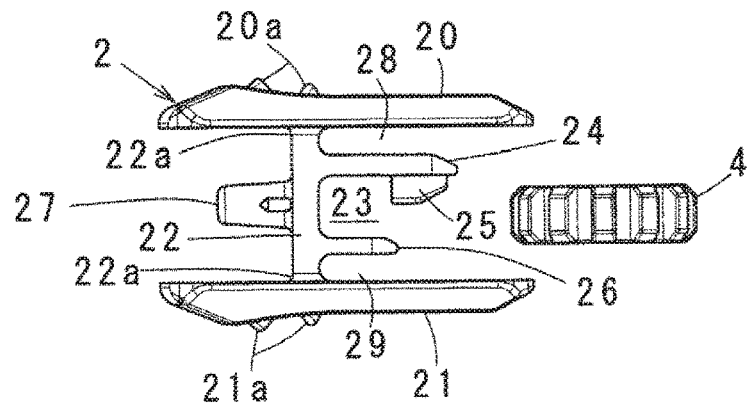
Figure 3B:
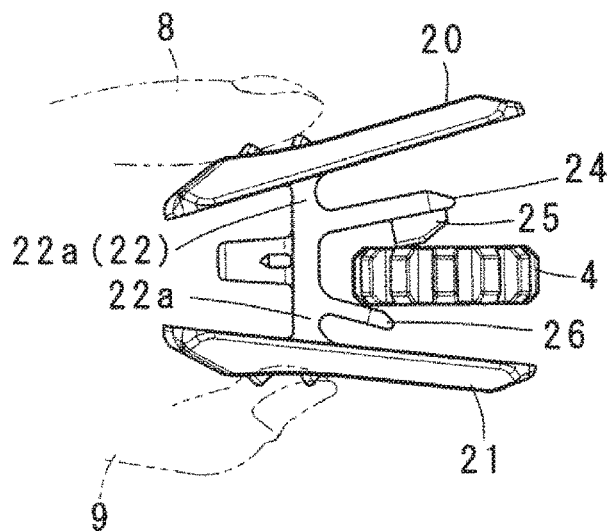
Figure 3C:
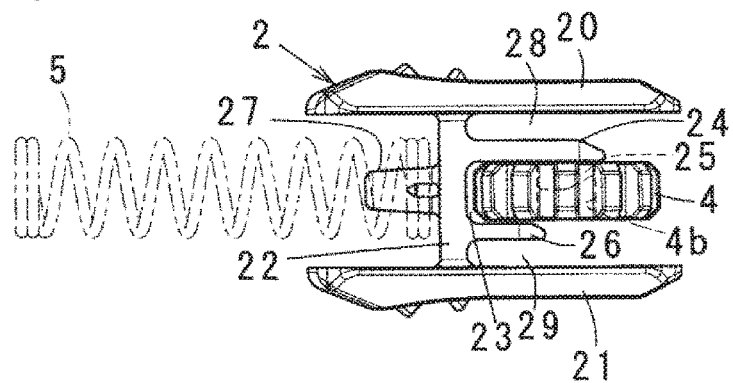

Further, the operating button 2 is assembled in the case 1 from a state in FIG. 3C in which the operating button 2 supports the gear-shaped engagement portion 4 as mentioned above. In this operation, the connection portion 22 is fitted into each of the long grooves 14 in the front and rear walls in such a manner as to position the corresponding operating portions 20 and 21 on the outer surfaces of the front and rear walls 10 and 11 of the case. Thereafter, the coil spring 5 is supported in a state in which the corresponding end 5a is brought into contact with the connection portion 22 via the shaft portion 27 as mentioned above.

The partition member 3 is formed into a small block shape in which a main body 30 has a size corresponding to the opening 17 of the case, as shown in FIGS. 2 and 5A-5C, and is provided with a pair of protruding portions 31 which is fitted to the facing long grooves 14, both side portions 34 which are partitioned by a vertical groove in both sides of each of the protruding portions 31, totally four stops 35 which are provided in a protruding manner in lower front and rear surfaces of the side portions 34, and a concave portion 32 which is arranged in a lower surface side of the main body 30.

In the partition member 3 mentioned above, a whole of the main body 30 is inserted into the opening 17 in the case 1. When both the side portions 34 are fitted along the corresponding grooves 13, the stops 35 at four front and rear positions are engaged with the corresponding locking holes 15, and whereby the partition member 3 is installed to the case 1. In this installed state, an inlet side of each of the long grooves 14 is closed by the corresponding protruding portion 31, and an inner side of the opening 17 of the case is separated into two sections. As a result, the band 7 is drawn out its one end 7a from a space between the one side wall 12 and the partition member 13 and the other end 7b is drawn out from a space between the other side wall 12 and the partition member 13, for example, in both the side walls 12 as shown in FIG. 5C.

(Example of use) In the cord lock 6 mentioned above, an assembled state and a using way are the same as JP H02-6809 Y, JP 3019914 Y and U.S. Pat. No. 5,477,593. The cord lock 6 is used, for example, for locking both ends 7a and 7b or one end of the band 7 arranged around an opening edge of a shoe, clothes, and a bag-shaped member or adjusting a drawing amount and a fastening degree of the band 7. Specifically, they are as follows.

Figure 4A:
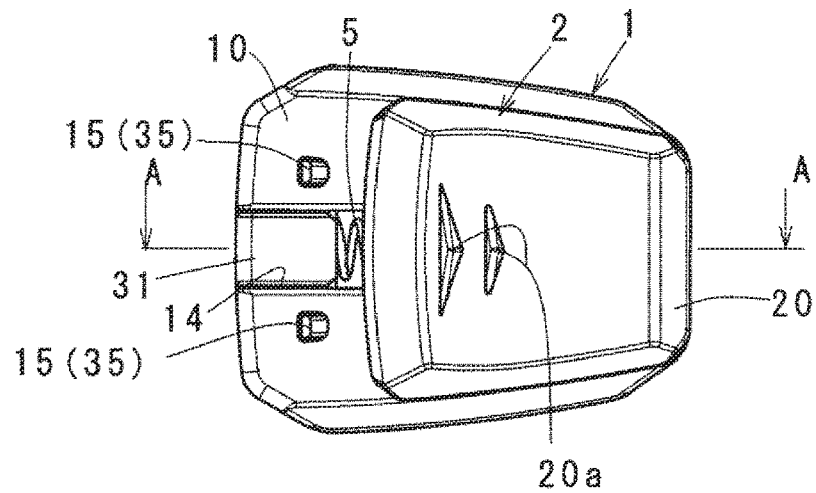
Figure 4B:
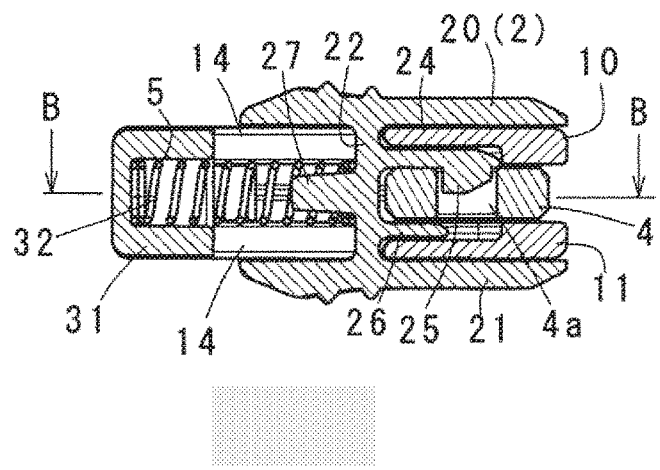
Figure 4C:
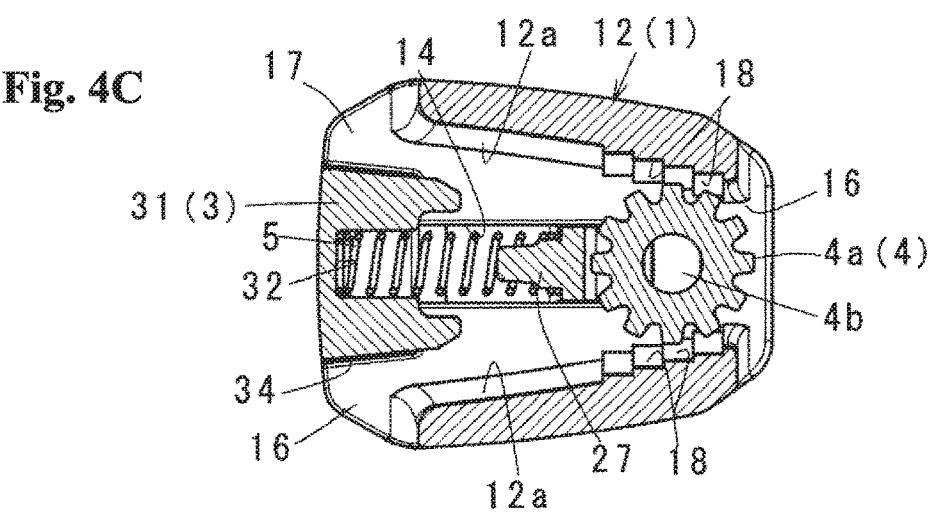

(1) FIGS. 4A, 4B and 4C show a state where the assembly of the cord lock 6 is finished. In this state, the operating button 2 is moved to the maximum to the opening 16 side on the basis of the biasing force of the coil spring 5, that is, moved until the connection portion 22 is brought into contact with the depth end surface of the long groove 14. The gear-shaped engagement portion 4 is pivotally supported to the pivot portion 25, and the gear tooth 4a in an outer periphery meshes with the toothed portion 18 provided in both the inclined portions 12a in a state in which the gear-shaped engagement portion 4 is rotatably constrained to a space which is divided by the support piece 24, the support portion 26 and both the side walls 12.

(2) FIGS. 5A, 5B and 5C show a middle state where the cord lock 6 is set to the band 7. In this operation, the front and rear operating portions 20 and 21 are moved with fingers against the biasing force of the coil spring 5 in a direction of an arrow shown by a one-dot chain line in FIG. 1B, that is, an opposite direction to the triangular mark 20a, and are kept in a state after the movement. Accordingly, the gear-shaped engagement portion 4 faces the inclined portion 12a in the opening 17 side by the release of the engagement with the toothed portion 18. As a result, a gap for inserting the band is formed in both inner sides between the gear-shaped engagement portion 4 and the inclined portion 12a. For example, both ends 7a and 7b of the band are drawn out of the opening 17 through the corresponding gap from the opening 16 side as shown in FIG. 5C. Thereafter, the fingers are released from the operating portions 20 and 21 after both ends 7a and 7b are drawn out with a necessary amount. According to the above structure, since the operating portions 20 and 21 of the operating button are arranged in the axial direction of the gear-shaped engagement portion 4, the operating portions can be formed wide in surface without deterioration of an outer appearance and it is possible to make a whole structure thin and compact.

Figure 6A:
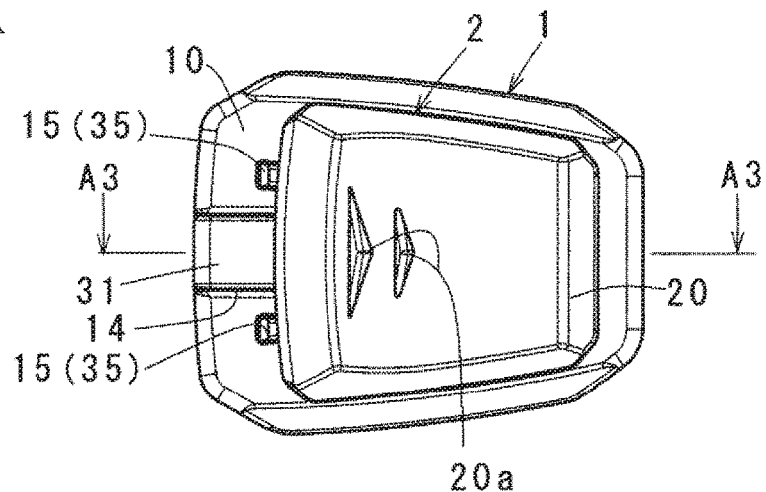
Figure 6B:
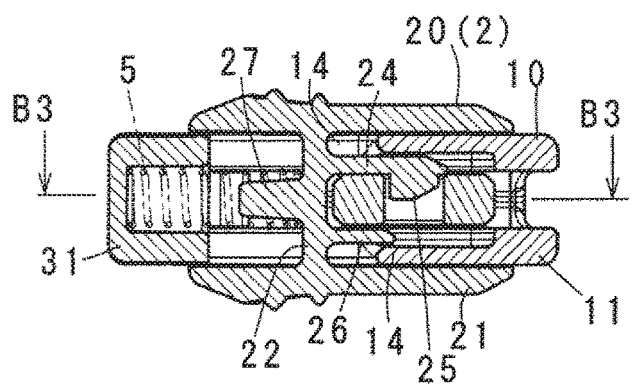
Figure 6C:
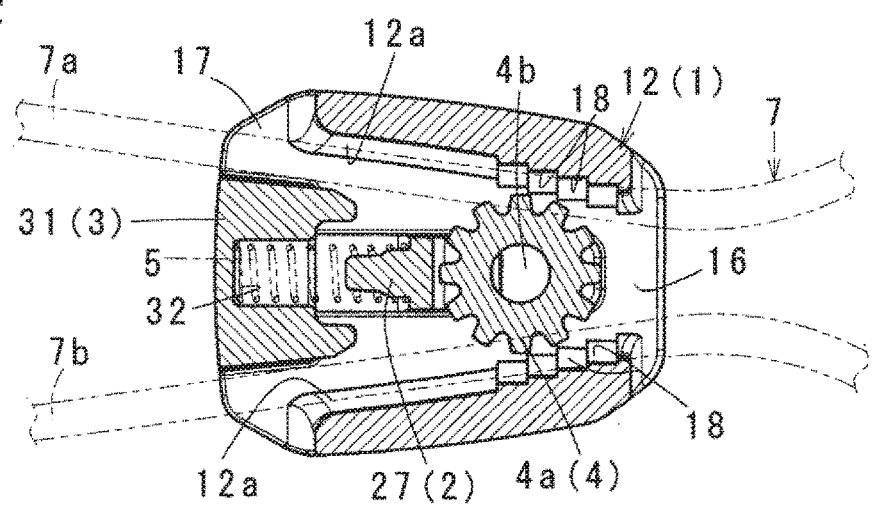

(3) FIGS. 6A, 6B and 6C show a state of using time where the cord lock 6 is set to the band 7 as mentioned above. More specifically, when the fingers are released from the operating portions 20 and 21 as mentioned above, the operating button 2 is moved to the opening 16 side on the basis of the biasing force of the coil spring 5, and the corresponding portion of the band 7 is pinched between the gear tooth 4a of the gear-shaped engagement portion 4 and the toothed portion 18 in one side, and the toothed portion 18 in the other side and cannot be drawn off.

(4) In the cord lock 6 mentioned above, the band 7 can obtain the stable and strong pinching force on the basis of biting action of both of the toothed portion 18 provided in the inclined portion 12b and the gear tooth 4a of the gear-shaped engagement portion, the gear-shaped engagement portion 4 is pivotally supported rotatably to the pivot portion 25 in the operating button side and is hard to be worn away, and the gear-shaped engagement portion 4 is arranged between the support piece 24 and the other support portion 26 in the state in which the gear-shaped engagement portion 4 is pivotally supported to the pivot portion 25. As a result, the engagement portion does not become non-rotatable due to the accidental inclination even if any load is applied from the band 7. Therefore, it is possible to efficiently reduce or absorb the excessive external force so as to stably maintain the initial pinching force, and it is possible to improve the durability.

Figure 1B:
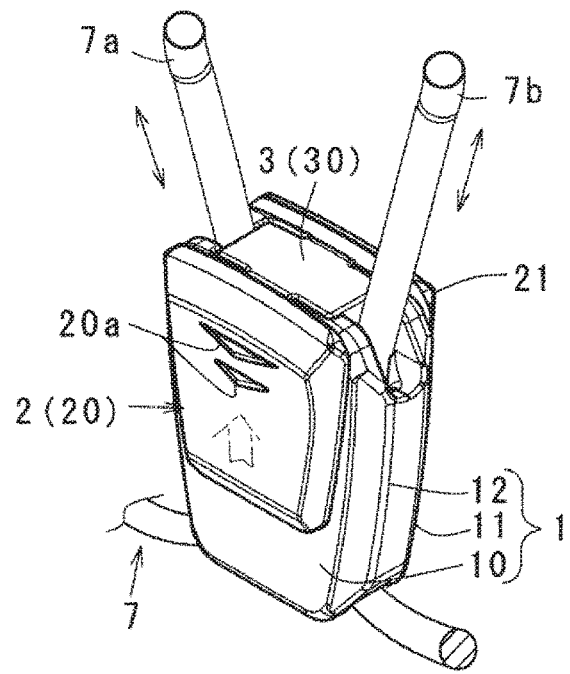

(5) In the case of adjusting the drawing amount and the fastening degree of the band 7 in the state at the using time that the cord lock 6 is set to the band 7 as mentioned above, the same operations as the case in FIGS. 5A, 5B and 5C are performed. More specifically, the operating button 2 is moved against the biasing force of the coil spring 5, and the drawing ends 7a and 7b sides of the band 7 are pulled or slacked at a necessary amount while keeping the state. An arrow in FIG. 1B schematically shows a process of adjusting the drawing amount and the fastening degree of the band 7 mentioned above.

Modified Example 1

FIGS. 7 and 8 show the other example of the elastically deforming portion 22a mentioned above in correspondence to FIGS. 3A, 3B and 3C. In this description, same reference numerals are attached to the same or similar positions to the above embodiment, and only changed points will be made apparent while omitting an overlapping description as much as possible.

Figure 7A:
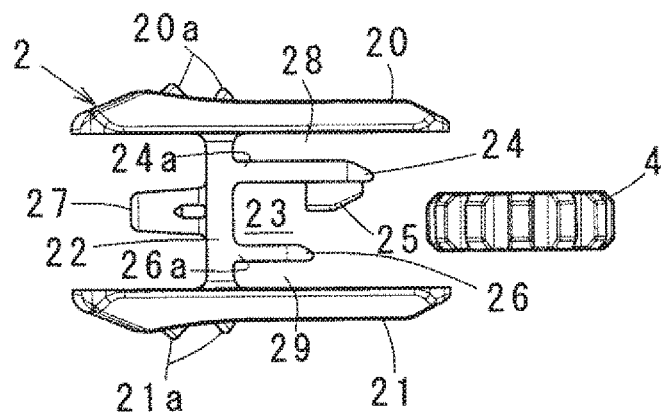
Figure 7B:
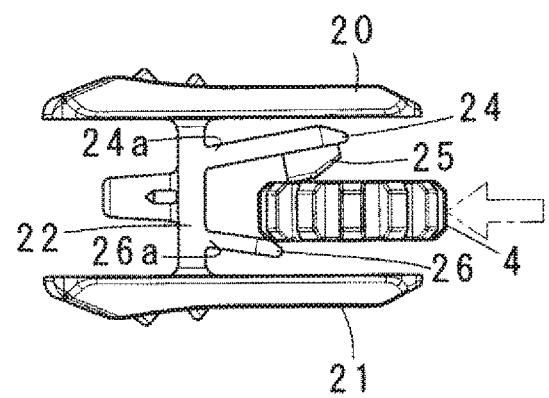
Figure 7C:
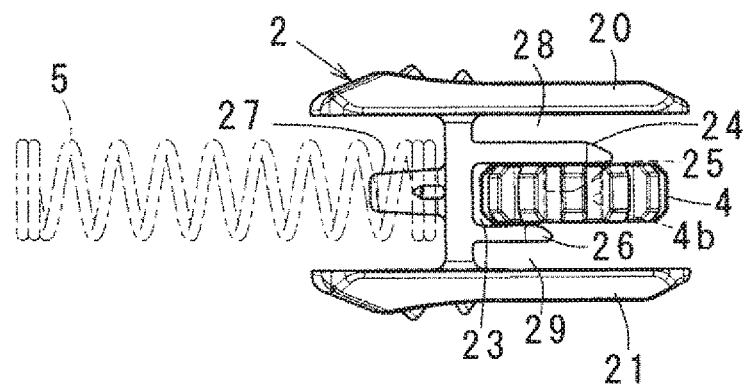

An operating button 2 according to the modified example 1 has elastically deforming portions 24a and 26a obtained by reducing thickness of positions where the support piece 24 and the support portion 26 (a support piece 26A in the case of FIGS. 8A, 8B and 8C) are connected to the connection portion 22, that is, a base end, in place of the elastically deforming portion 22a according to the above embodiment. As a result, in the modified example 1, in the case where the gear-shaped engagement portion 4 is assembled in the operating button 2, the support piece 24 and the support portion 26 (the support piece 26A) displace in a direction of expanding the distance therebetween around the elastically deforming portions 24a and 26a serving as supporting points by pressing the gear-shaped engagement portion 4 in a direction of an arrow in the drawing between the support piece 24 and the support portion 26 (the support piece 26A in the case of FIGS. 8A, 8B and 8C), as shown in FIG. 7B. Accordingly, in the gear-shaped engagement portion 4, the support piece 24 and the support portion 26 (the support piece 26A) elastically restore and are rotatably supported as shown in FIG. 7C by fitting the pivot portion 25 to the shaft hole 4b in a state in which the support piece 24 and the support portion 26 (the support piece 26A) are displaced by the elastically deforming portions 24a and 26a. Therefore, even in this modified example 1, the gear-shaped engagement portion 4 can be supported to the pivot portion 25 with the one-touch operation.

In the modified example 1, although the support piece 24 and the support portion 26 (the support piece 26A) are both formed to be displaceable by the elastically deforming portions 24a and 26a, only one of the support piece 24 and the support portion 26 may be made displaceable by the elastically deforming portion 24a or 26a.

Figure 8A:
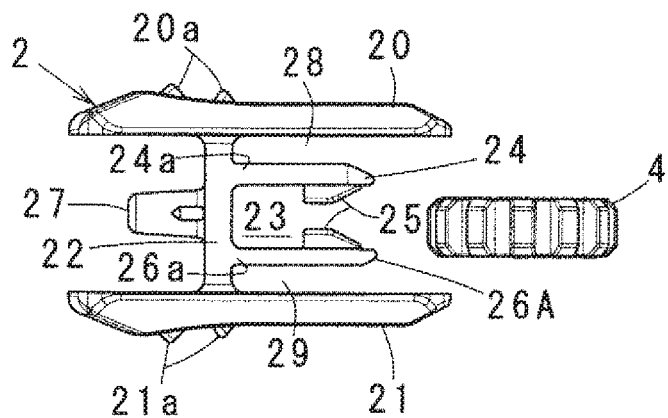
Figure 8B:
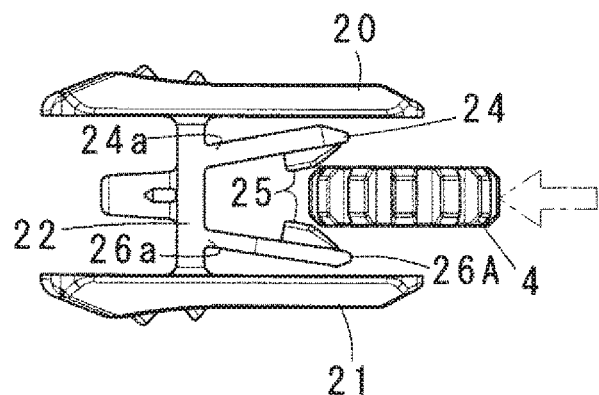
Figure 8C:
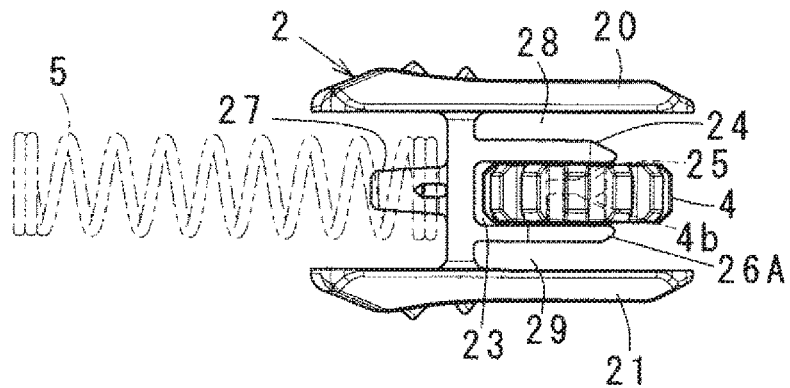
Figure 9A:
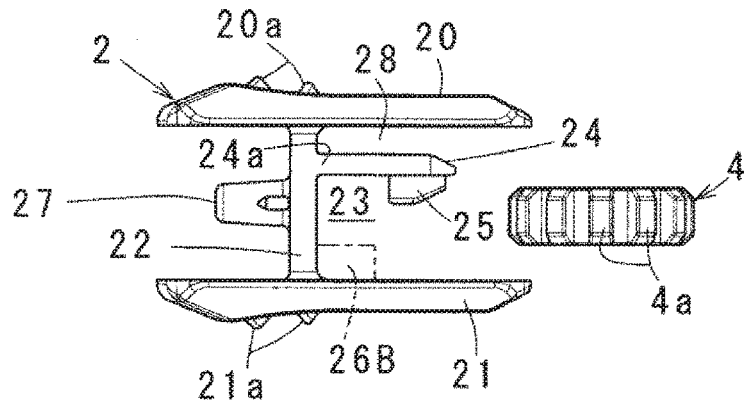

Further, as the other structure of the pivot portion, the support portion 26 mentioned above is replaced by the support piece 26A, both the support pieces 24 and 26A are set to approximately the same length, and the pivot portions 25 (this pivot portion 25 is shorter than the pivot portion 25 according to the above embodiment) having a predetermined length are protruded out of both the support pieces 24 and 26A in a facing manner, as is exemplified in FIGS. 8A, 8B and 8C. As a result, in this example, each of the pivot portions 25 is inserted into the shaft hole 4b from an opposite direction so as to be fitted.

Modified Example 2

Figure 9B:
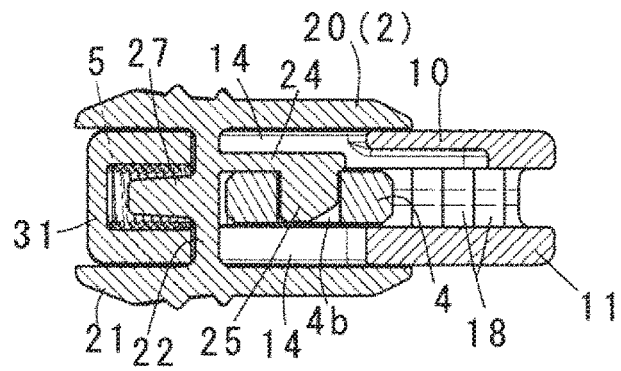
Figure 9C:
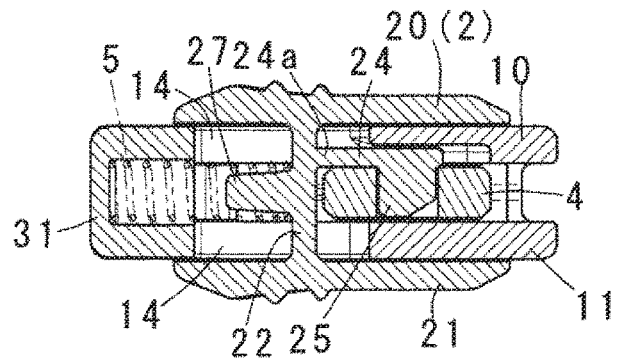
Figure 10A:
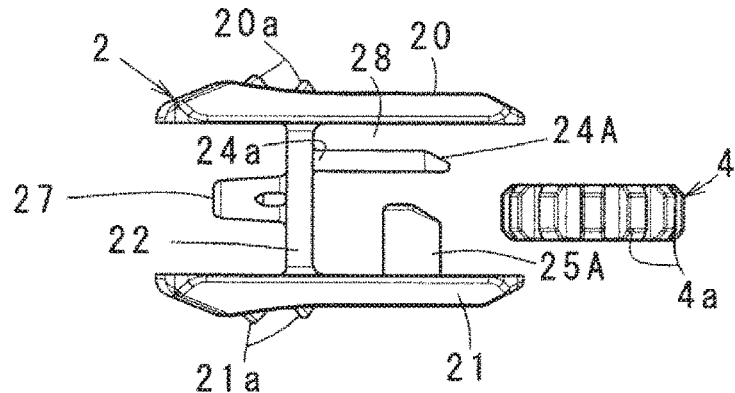

FIGS. 9A to 9C show a modified example in which the support portion 26 and the support piece 26A mentioned above are omitted, FIG. 9A corresponds to FIG. 3A, FIG. 9B corresponds to FIG. 5B, and FIG. 9C corresponds to FIG. 6B. In this description, same reference numerals are attached to the same or similar positions to the above embodiment, and only changed points will be made apparent while omitting an overlapping description as much as possible.

An operating button 2 according to the modified example 2 is changed in a point that the support portion 26 and the support piece 26A are omitted among the support piece 24 and the support portion 26 or the support piece 26A mentioned above, a point that the gear-shaped engagement portion 4 is constrained in a freely oscillating manner in an internal space 23 divided by the support piece 24, the connection portion 22 and the rear wall 11, and a point that the support piece 24 is formed in the elastically deforming portion 24a by reducing thickness of the position where the support piece 24 is connected to the connection portion 22, that is, the base end in the same manner as the modified example 1. As a result, according to the support structure, for example, the shaft hole 4b is operated to be fitted to the support shaft 25 by moving the gear-shaped engagement portion 4 in a thickness direction or a radial direction after inserting the gear-shaped engagement portion 4 into the internal space 23 from the portion between the rear side operating portion 21 and the pivot portion 25, or the shaft hole 4b is operated to be fitted to the support shaft 25 by pressing the gear-shaped engagement portion 4 to the support piece 24 or the pivot portion 25 so that the support piece 24 elastically displaces in a direction of the front wall 20 around the elastically deforming portion 24a serving as a supporting point.

In the modified example 2, the gear-shaped engagement portion 4 can be easily supported to the operating button 2, and is assembled in the case from this state. As a result, the modified example 2 is excellent in an assembling property. Further, the gear-shaped engagement portion 4 can be arranged between the support piece 24 and the rear wall 11 in a state in which the gear-shaped engagement portion 4 is pivotally supported to the pivot portion 25 within the case. As a result, the gear-shaped engagement portion 4 is hard to be made non-rotatable due to an accidental inclination even if any great load is applied from the band. Therefore, it is possible to efficiently reduce or absorb the excessive external force, it is possible to stably maintain the pinching force mentioned above, and it is possible to improve the durability.

As the other example of the modified example 2 mentioned above, the gear shaped engagement portion 4 may be arranged between the support piece 24 and the support portion 26B by provision of the other support portion 26B together with the support piece 24 as shown by a one-dot chain line in FIG. 9A. In this case, it is necessary to make the length of the groove 14 among both the long grooves 14 corresponding to the support portion 26B at a degree for setting clearance in the support portion 26B. However, the gear-shaped engagement portion 4 is hard to be made non-rotatable due to the accidental inclination even if the gear-shaped engagement portion 4 applies the great load from the band. As a result, it is possible to efficiently reduce or absorb the excessive external force, it is possible to stably maintain the pinching force mentioned above and it is possible to improve the durability.

Modified Example 3

Figure 10B:
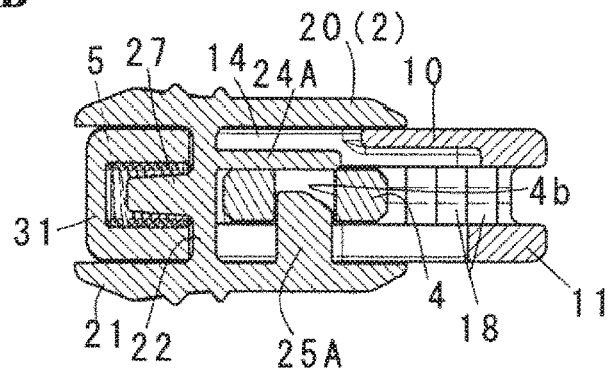
Figure 10C:
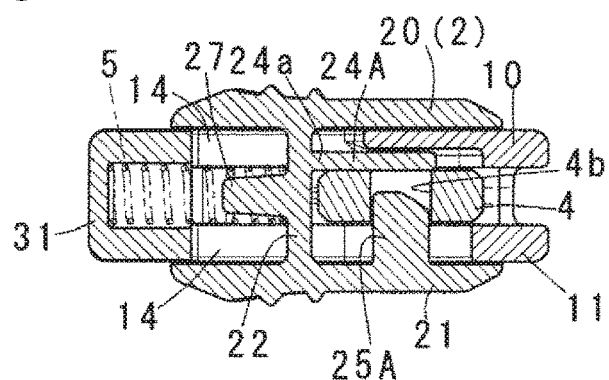
Figure 12A:
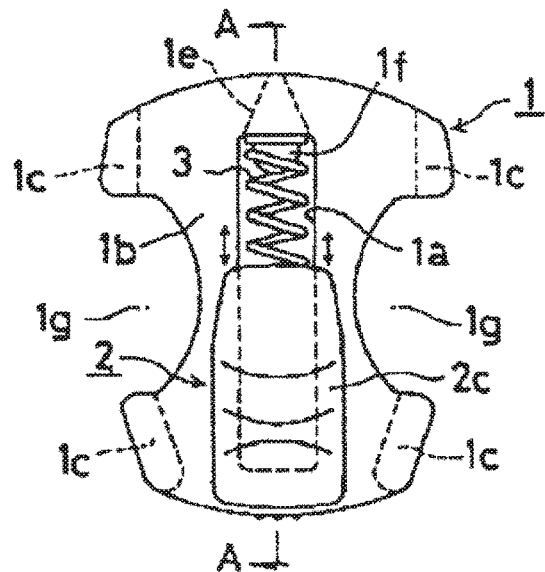
FIGS. 12A and 12B are views for describing a structure of JP 3019914 Y.
Figure 12B:
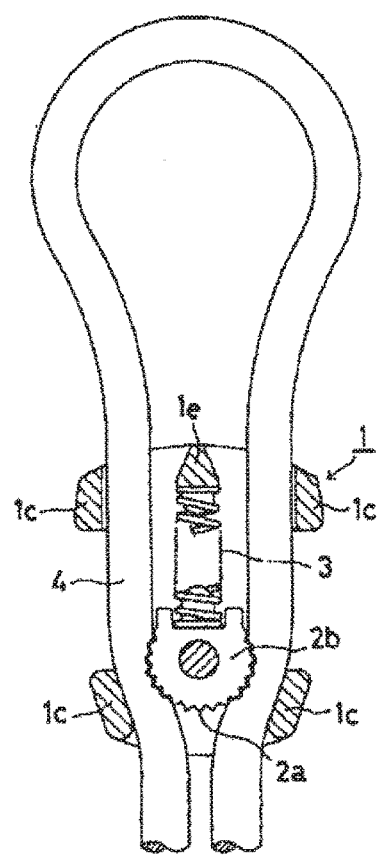
Figure 13A:
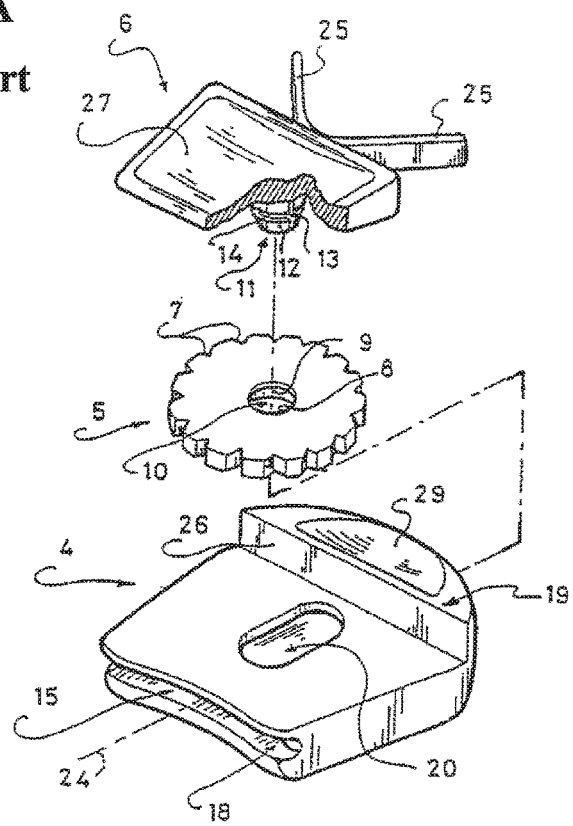
FIGS. 13A and 13B are views for describing a structure of U.S. Pat. No. 5,477,593.
Figure 13B:
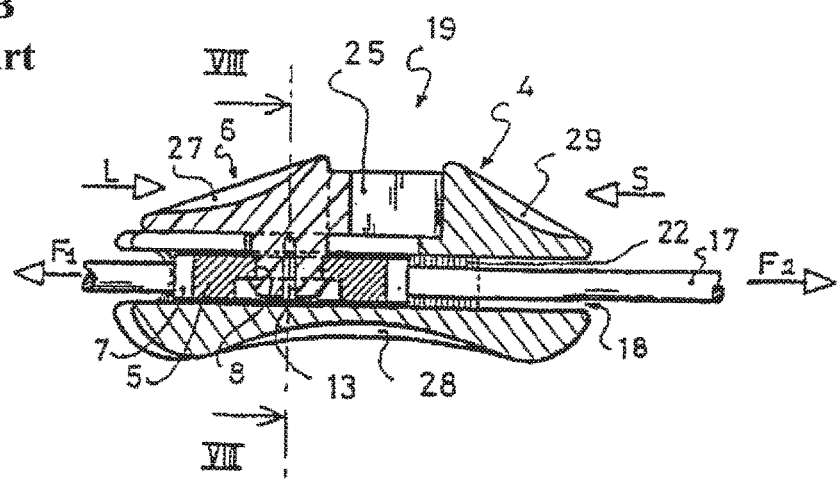

FIGS. 10A to 10C show the other modified example of the pivot portion 25 mentioned above, FIG. 10A corresponds to FIG. 3A, FIG. 10B corresponds to FIG. 5B, and FIG. 10C corresponds to FIG. 6B. Also in this description, same reference numerals are also attached to the same or similar positions to the above embodiment, and only changed points will be made apparent while omitting an overlapping description as much as possible.

The operating button 2 according to the modified example 3 is changed from the structure mentioned above in a point that the support piece 24 is changed to a support portion 24A in which the pivot portion is omitted, a point that the support portion 26 and the support piece 26A are omitted, a point that a pivot portion 25A is provided in a protruding manner in an inner surface of the rear wall side operating portion 21 which is one of both the operating portions, and a point that the long hole 14 provided in the rear wall 11 is made a little longer than the long hole 14 of the front wall 10, and the support portion 24A can displace around a position where the support portion 24A is connected to the connection portion 22, that is, an elastically deforming portion 24a in a base end serving as a supporting point. As a result, in this support structure, for example, the shaft hole 4b is operated to be fitted to the pivot portion 25A by inserting the gear-shaped engagement portion 4 into the internal space which is divided by the support portion 24A, the rear side operating portion 21 and the connection portion 22 in connection with the displacement of the support piece 24A in the direction of the front wall 20 from the position between the pivot portion 25A and the support portion 24A in the rear side operating portion 21, and thereafter moving the gear-shaped engagement portion in the thickness direction or the radial direction. As can be known from the comparison between FIGS. 9A-9C and 10A-10C, the long hole 14 can be set short in the embodiment and the modified examples 1 and 2, in comparison with the structure such as the modified example 3 in which the pivot portion 25 is provided in the operating portion 21 of the operating button. As a result, the embodiment and the modified examples 1 and 2 are advantageous in the light of the rigidity and the outer appearance.

Even in this modified example 3, the gear-shaped engagement portion 4 can also be supported easily to the operating button 2, and is assembled in the case from this state. As a result, the modified example 3 is excellent in the assembling property. Further, the gear-shaped engagement portion 4 can be arranged between the support portion 24A and the rear wall 11 in a state in which the gear-shaped engagement portion 4 is pivotally supported to the pivot portion 25A within the case. As a result, the gear-shaped engagement portion 4 is hard to be made non-rotatable due to the accidental inclination even if any great load is applied from the band. Therefore, it is possible to efficiently reduce or absorb the excessive external force, it is possible to stably maintain the pinching force mentioned above, and it is possible to improve the durability.

The above embodiment and the modified examples do not restrict the present invention. The present invention can be variously modified and developed in its details as occasion demands as long as the structures specified by claims are substantially provided. Particularly, the outer appearance shapes of the case and the operating button can be appropriately changed. The intended use includes a fastening band for the shoe group, a band opening and closing an opening of a bag body such as a knapsack and a bag, a band throttling a neck or a barrel portion of the clothes, and a fastening band or a decorative band for a helmet or a hat. Further, the present invention can be widely applied to the case where a band such as a cord or a belt is fastened to or loosed from the target position in addition to the above.

The present application claims the priority of Japanese Patent Application No. 2016-236353 filed on Dec. 6, 2016, the disclosure of which is incorporated herein as a reference.

REFERENCE SIGNS LIST 1 case (corresponding to main body, 16 is one side opening and 17 is the other side opening)
2 operating button (20 and 21 are operating portions)
3 partition member (corresponding to come-off prevention portion, 35 is stop and 32 is concave portion)
4 gear-shaped engagement portion (4a is gear tooth and 4b is shaft hole)
5 coil spring (biasing means)
6 cord lock
7 band (7a is one end and 7b is the other end)
10 front wall (15 is locking hole)
11 rear wall (15 is locking hole)
12 side wall (12a is inclined portion and 18 is toothed portion provided in inclined portion)
13 inducting concave portion
14 long groove (corresponding to long or elongated hole)
22 connection portion (22a is elastically deforming portion)
23 internal space
24 support piece (24a is elastically deforming portion)
24A support portion (24a is elastically deforming portion)
25 pivot portion
25A pivot portion
26 support portion
26A support piece (24a is elastically deforming portion)
26B support portion
32 concave portion (corresponding to seat)

What is claimed is:

1. A cord lock comprising:
a main body which is formed into a tubular shape adapted to insert a band from one side opening of the tubular shape into another side opening, and having front and rear walls and two side walls, an elongated hole arranged so as to face the front and rear walls and extending in a direction of a tube, and an inclined portion formed in an inner surface of the side walls and expanding toward a depth; and
an operating button having a front wall side operating portion and a rear wall side operating portion arranged on the front wall and the rear wall, respectively, a connection portion integrally connected to the front and rear wall side operating portions through the elongated hole, a biasing device biasing the front and rear wall side operating portions to the one side opening to cooperate with the inclined portion, and a gear-shaped engagement portion which is adapted to pinch the band inserted into the tubular shape,
wherein the operating button protrudes in a direction from at least one of the front wall side operating portion and the rear wall side operating portion toward the other thereof, and has a pivot portion in which the gear-shaped engagement portion is axially supported, a distance between an axial end of the pivot portion and a shaft end supporting the gear-shaped engagement portion arranged in another side or a support portion being narrower than a thickness of the gear-shaped engagement portion, so that the distance is expanded by an elastically deforming portion which is arranged in the operating button, and the gear-shaped engagement portion is capable of passing through.

2. The cord lock according to claim 1, wherein the elastically deforming portion is the connection portion.

3. The cord lock according to claim 1, wherein the elastically deforming portion is the support portion.

4. The cord lock according to claim 1, wherein the biasing device is a coil spring, and includes a come-off prevention portion so as to partly close an opening end as well as a seat which receives a corresponding end portion of the coil spring in the another side opening, such that an open portion other than a closed portion of the come-off prevention portion is set to an insertion portion of the band.

5. A cord lock comprising:
a main body which is formed into a tubular shape adapted to insert a band from one side opening of the tubular shape into another side opening, and having front and rear walls and two side walls, an elongated hole arranged so as to face the front and rear walls and extending in a direction of a tube, and an inclined portion formed in an inner surface of the side walls and expanding toward a depth; and
an operating button having a front wall side operating portion and a rear wall side operating portion arranged on the front wall and the rear wall, respectively, a connection portion integrally connected to the front and rear wall side operating portions through the elongated hole, a biasing device biasing the front and rear wall side operating portions to the one side opening to cooperate with the inclined portion, and a gear-shaped engagement portion which is adapted to pinch the band inserted into the tubular shape,
wherein the operating button has a support piece which is provided in the connection portion, and a pivot portion which is arranged in the support piece and protrudes toward one of the front wall side operating portion and the rear wall side operating portion to axially support the gear-shaped engagement portion, a distance between an axial end of the pivot portion and a shaft end supporting the gear-shaped engagement portion arranged in another side or a support portion being narrower than a thickness of the gear-shaped engagement portion, the distance being expanded by an elastically deforming portion which is arranged in the operating button to pass the gear-shaped engagement portion.

* * * * *